US012655774B1

(12) United States Patent
Kim et al.

(10) Patent No.: US 12,655,774 B1
(45) Date of Patent: Jun. 16, 2026

(54) CMC COMPONENT WTH SPRING ELEMENT

(71) Applicant: RTX Corporation, Farmington, CT (US)

(72) Inventors: Russell Kim, Temecula, CA (US); Monty Harned, San Clemente, CA (US); David J. Wasserman, Hamden, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 19/228,191

(22) Filed: Jun. 4, 2025

(51) Int. Cl.
*F01D 25/24* (2006.01)
*F01D 11/08* (2006.01)

(52) U.S. Cl.
CPC ............ *F01D 25/246* (2013.01); *F01D 11/08* (2013.01); *F05D 2260/38* (2013.01); *F05D 2300/175* (2013.01); *F05D 2300/6033* (2013.01)

(58) Field of Classification Search
CPC . F01D 9/04; F01D 9/047; F01D 11/08; F01D 25/24; F01D 25/246; F05B 2260/38
See application file for complete search history.

(56) References Cited

U.S. PATENT DOCUMENTS 8,926,270 B2 * 1/2015 Karafillis .................. F01D 9/02 415/173.1
10,161,259 B2 * 12/2018 Gibson ................... F01D 11/02
10,465,558 B2 * 11/2019 Shapiro ................... F01D 11/08
10,633,995 B2 * 4/2020 Barker .................. F01D 25/246
11,208,911 B2 12/2021 Sadler et al.
11,255,210 B1 * 2/2022 Freeman ................. F01D 11/16
11,286,812 B1 3/2022 Freeman et al.
11,346,237 B1 5/2022 Freeman et al.
11,713,694 B1 8/2023 Freeman et al.

* cited by examiner

*Primary Examiner* — Christopher R Legendre
(74) *Attorney, Agent, or Firm* — Millen, White, Zelano & Branigan, P.C.; Brion P. Heaney

(57) ABSTRACT

Interference fits between CMC components and ancillary metal hardware within an engine casing can lead to damage to the CMC component and features thereof during assembly and/or over duration of many operating cycles. A method and arrangement are provided to prevent or ameliorate harmful effects resulting from interactions between CMC components and ancillary metal hardware by using spring elements. The spring elements are held in compression between an end wall of a bore hole in ancillary metal hardware and a structural feature, such as a flange, of the CMC component to urge the CMC component into a sealing and supporting engagement with a surface of ancillary metal hardware.

18 Claims, 6 Drawing Sheets

CMC COMPONENT WTH SPRING ELEMENT

FIELD OF THE INVENTION

The present disclosure relates generally to ceramic matrix composite (CMC) components. In particular, the present disclosure concerns interaction between CMC components and static hardware.

BACKGROUND OF THE INVENTION

Gas turbine engines, in general, include a fan section, a compressor section (e.g., a high-pressure compressor module and a low-pressure compressor module), a combustion section, and a turbine section (e.g., a high-pressure turbine module and a low-pressure turbine module). Air enters through the fan section and is compressed in the compressor section before being introduced into the combustion section. In the combustion section, the air is mixed with fuel and ignited to generate a high-energy, high temperature gas flow. The high-energy, high temperature gas flow is expanded in the turbine section which is used to create thrust and drive the compressor and fan sections.

Certain components of gas turbine engines are thus exposed to the high-energy, high temperature gas flow (gaspath), i.e., flow path components. Therefore, it is desirable that such components be made of materials with high heat resistance such as ceramic matrix composites (CMCs). CMC components can withstand much higher operating temperatures (e.g., greater than 1400° C.) than components composed of superalloys.

While CMC materials can withstand much higher operating temperatures, CMCs have comparably lower thermal conductivity than superalloys. To increase their operational lifespans, precautions can be taken to cool CMC components by subjecting the components, or sections thereof, to a flow of cooling fluid (e.g., air). In this regard, it is particularly desirable to take steps to efficiently cool CMC components using available cooling air flows and to use the cooling air in an efficient manner.

Additionally, CMC components can be supported within the engine casing by ancillary metal hardware. Assembly loads and sealing are challenging to control with CMC components where interference fits are used with the ancillary metal hardware. Damage to the CMC component and features during assembly and/or over duration of many cycles can occur with such interference fits.

Thus, there is a continuing need for methods and arrangements to promote sealing for efficient use of cooling air flow and to prevent or ameliorate harmful effects resulting from interactions between CMC components and ancillary metal hardware.

SUMMARY OF THE INVENTION

In general, the present disclosure relates to methods for attaching CMC components to ancillary hardware in an engine casing. In particular, the present disclosure relates to methods for attaching CMC components to ancillary hardware in an effective sealing arrangement.

The present disclosure is directed, in a first aspect, to an arrangement for attaching a ceramic matrix component to ancillary hardware of a gas turbine engine comprising:

a CMC component comprising a substrate containing ceramic fibers/fiber tows within a matrix, the substrate having an outer radial surface and a first forward flange and a second aft flange, each flange extending from the outer radial surface in the radial direction;

one or more ancillary hardware elements for bearing the load of the CMC component, wherein at least one of the ancillary hardware elements has a slot for receiving one of the first and second flanges of the CMC component, and at least one of the ancillary hardware elements has a bore hole, and a spring element positioned within the bore hole, wherein the spring element is held in compression between an end wall of the bore and a surface of the one of the first and second flanges, whereby compressive force from the spring element held in compression urges at least one of the first and second flanges into sealing contact with a surface of one of the ancillary hardware elements.

The present disclosure is also directed, in a further aspect, to a method of attaching a ceramic matrix component (CMC) to ancillary hardware of a gas turbine engine, the method comprising:

providing a CMC component comprising a substrate containing ceramic fibers/fiber tows within a matrix, the substrate having an outer radial surface and a flange extending from the outer radial surface;

providing an ancillary hardware element for bearing the load of the CMC component, the ancillary hardware element having a slot for receiving the flange of the CMC component, and a bore that connects to the slot, and positioning a spring element within the bore of the ancillary hardware element, wherein the spring element is held in compression between a wall of the bore and a surface of the flange, and optionally a retainment pin extends through the flange, the spring element, and at least a portion of the ancillary hardware element.

The present disclosure is further directed, in an additional aspect, to a turbine engine comprising:

a fan section, a compressor section, a combustion section, and a turbine section, the turbine section including at least one rotor and one or more turbine blade(s) extending radially outwardly from the at least one rotor;

a CMC component comprising a substrate containing ceramic fibers/fiber tows within a matrix, the substrate having an outer radial surface and a first forward flange and a second aft flange, each flange extending from the outer radial surface in the radial direction;

one or more ancillary hardware elements for bearing the load of the CMC component, wherein at least one of the ancillary hardware elements has a slot for receiving one of the first and second flanges of the CMC component, and at least one of the ancillary hardware elements has a bore hole, and a spring element positioned within the bore hole, wherein the spring element is held in compression between an end wall of the bore and a surface of the one of the first and second flanges, whereby compressive force from the spring element held in compression urges at least one of the first and second flanges into sealing contact with a surface of one of the ancillary hardware elements.

In further embodiments of the present disclosure, including further embodiments of the above exemplary embodiments, the spring element comprises one or more wave springs.

In further embodiments of the present disclosure, including further embodiments of the above exemplary embodiments, the spring element comprises one or more coil or helical springs.

In further embodiments of the present disclosure, including further embodiments of the above exemplary embodiments, the spring element is a C-shaped spring.

In further embodiments of the present disclosure, including further embodiments of the above exemplary embodiments, the arrangement further comprises a retainment pin which passes through a hole in each of the first forward flange and the second aft flange, the retention pin having a first end and a second end, wherein the first end and second end of the retention pin are positioned within holes in the one or more ancillary hardware elements to thereby support the CMC component.

In further embodiments of the present disclosure, including further embodiments of the above exemplary embodiments, the arrangement further comprises a retainment pin which passes through a hole in each of the first forward flange and the second aft flange, the retention pin having a first end and a second end, wherein the first end of the retention pin is positioned within the bore hole at the ancillary hardware element(s), and the spring element surrounds a portion of the retention pin.

In further embodiments of the present disclosure, including further embodiments of the above exemplary embodiments, the spring element is held in compression between an end wall of the bore and a surface of the first forward flange, whereby compressive force from the spring element held in compression urges the second aft flange into sealing contact with a surface of one of the ancillary hardware elements.

In further embodiments of the present disclosure, including further embodiments of the above exemplary embodiments, the spring element is held in compression between an end wall of the bore and a surface of the second aft flange, whereby compressive force from the spring element held in compression urges the second aft flange into sealing contact with a surface of one of the ancillary hardware elements.

In further embodiments of the present disclosure, including further embodiments of the above exemplary embodiments, the spring element is made from a superalloy metal.

In further embodiments of the present disclosure, including further embodiments of the above exemplary embodiments, the superalloy metal is a Ni-based superalloy or Co-based superalloy.

In further embodiments of the present disclosure, including further embodiments of the above exemplary embodiments, the superalloy metal is selected from Ni, Cr and Mo alloys (nickel-chromium-molybdenum alloys), Ni, Cr, Co, and Mo alloys (nickel-chromium-cobalt-molybdenum alloys), and Ni, Cr, and Fe alloys (nickel-chromium-iron alloys), In further embodiments of the present disclosure, including further embodiments of the above exemplary embodiments, the superalloy metal is selected from AMS 5879, AMS 5914, AMS 5950, AMS 5704-5709, AMS 5715, AMS 5754, AMS 5798, AMS 5542, AMS 5598, AMS 5759, Haynes 188, and Haynes 25.

In further embodiments of the present disclosure, including further embodiments of the above exemplary embodiments, the CMC component is selected from blade outer air seal(s) (BOAS(s)), BOAS segments, other seals, vane airfoils and platforms therefor, blade airfoils and platforms therefor, combustor liners, and support rings or disks, and exhaust nozzle flaps and seals.

In further embodiments of the present disclosure, including further embodiments of the above exemplary embodiments, the CMC component is a BOAS segment.

In further embodiments of the present disclosure, including further embodiments of the above exemplary embodiments, the ceramic fiber tows are SiC fiber tows and/or the matrix contains SiC.

BRIEF DESCRIPTION OF FIGURES

The features of the disclosure believed to be novel and the elements characteristic of the invention are set forth with particularity in the appended claims. The figures are for illustration purposes only and are not drawn to scale. The disclosure itself, however, both as to organization and method of operation, can best be understood by reference to the description of the preferred embodiment(s) which follows, taken in conjunction with the accompanying drawings in which:

DETAILED DESCRIPTION OF THE INVENTION

Figure 1:
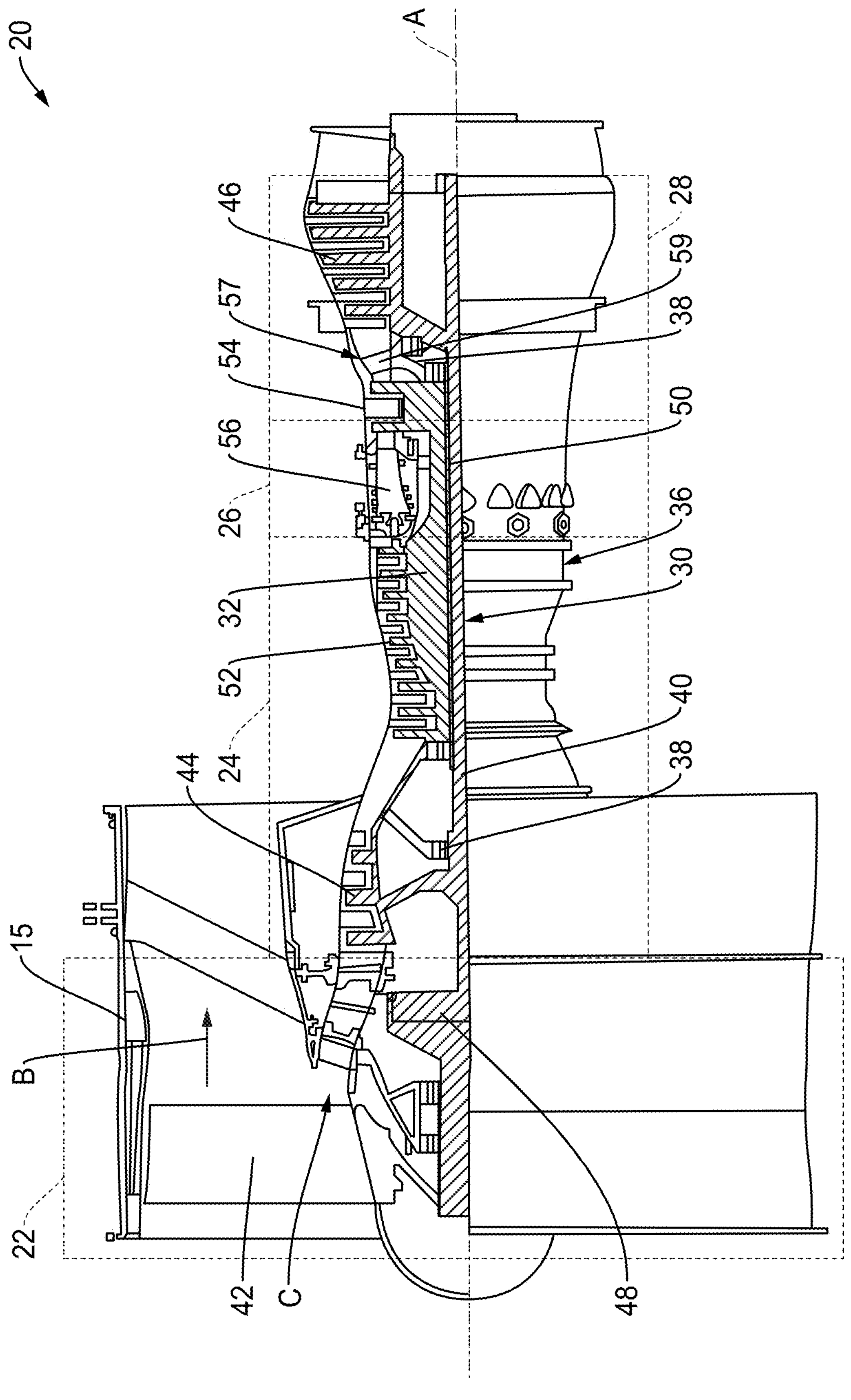
FIG. 1 schematically illustrates a partial cross section of an exemplary gas turbine engine.

The embodiments of the present disclosure can comprise, consist of, and consist essentially of the features and/or steps described herein, as well as any of the additional or optional ingredients, components, steps, or limitations described herein or would otherwise be appreciated by one of skill in the art. It is to be understood that all concentrations disclosed herein are by weight percent (wt. %.) based on a total weight of the composition unless otherwise indicated.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of the embodiments of the inventive concepts, numerous specific details are set forth in order to provide a more thorough understanding of the inventive concepts. It will be apparent to one skilled in the art, however, having the benefit of the instant disclosure that the inventive concepts disclosed herein may be practiced without these specific details.

The present disclosure provides a method and means for engaging CMC components with ancillary metal hardware to promote sealing and provide load transfer for supporting the CMC components. In particular, the present disclosure relates to the use of spring elements to apply sufficient load to ensure that the CMC will engage with the adjacent hardware of interest to provide sealing and/or load transfer without using an interference fit.

In the discussion below, axial refers to a direction that coincides with the longitudinal axis of the engine. Radial refers to a direction that is radial with respect to the longitudinal axis of the engine. Circumferential refers to a direction that corresponds to the circumference of a circle around the longitudinal axis of the engine. The leading edge/portion of a structure is the edge/portion that faces in the direction toward the flow of the hot gases, i.e., faces upstream. The trailing edge/portion of a structure is the edge/portion that faces in the direction away from the flow of the hot gases, i.e., faces downstream.

FIG. 1 schematically illustrates an example of a gas turbine engine 20 (i.e., a two-spool turbofan) which includes a fan section 22, a compressor section 24, a combustor section 26, and a turbine section 28. Fan section 22 drives air along a bypass flow path B in a bypass duct defined within a housing 15, and also along a core flow path C for compression in compressor section 24, with subsequent introduction into combustor section 26, followed by expansion through turbine section 28. Although FIG. 1 depicts a two-spool turbofan gas turbine engine, it should be understood that the concepts described herein are not limited to use with two-spool turbofan engines and may be applied to other types of turbine engines.

Engine 20 generally includes a low-speed spool 30 and a high-speed spool 32 mounted for rotation about an engine central longitudinal axis A, relative to an engine static structure 36, via several bearing systems 38. Various bearing systems 38 at various locations may alternatively or additionally be provided. The location of bearing systems 38 may be varied as appropriate to the application.

The low-speed spool 30 generally includes an inner shaft 40 that interconnects a first (or low) pressure compressor 44 and a first (or low) pressure turbine 46. Inner shaft 40 is connected to fan 42 through a speed change mechanism, which in this exemplary embodiment is illustrated as a geared structure 48 to drive fan 42 at a lower speed than the low-speed spool 30. High-speed spool 32 includes an outer shaft 50 that interconnects a second (or high) pressure compressor 52 and a second (or high) pressure turbine 54. Combustor 56 is positioned between high pressure compressor 52 and high-pressure turbine 54. A mid-turbine frame 57 of the engine static structure 36 may be arranged generally between the high-pressure turbine 54 and the low-pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core air flow is first compressed by low pressure compressor 44, and then by the high-pressure compressor 52. Thereafter, the core air flow is mixed and burned with fuel in combustor 56, then expanded in high pressure turbine 54 and low-pressure turbine 46. The mid-turbine frame 57 includes airfoils 59 which are in the core airflow path C. The turbines 46 and 54 rotationally drive the respective low-speed spool 30 and high-speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low-pressure compressor, or aft of the combustor section 26 or even aft of turbine section 28, and fan 42 may be positioned forward or aft of the location of gear system 48.

The turbine section 28 includes at least one rotor and at least one blade extending radially outwardly from the rotor. The turbine section 28 may further include a blade outer air seal(s) (BOAS(s)). The blade outer air seal can be an assembly of a plurality of BOAS segments that together form an annular shaped shroud around the engine's central longitudinal axis A which is positioned between an outer casing of the engine and the turbine blade(s) of the turbine section.

As noted above, gas turbine engine components can be made from CMC materials. Such components include blade outer air seal(s) (BOAS(s)), BOAS segments, other seals, vane airfoils and platforms therefor, blade airfoils and platforms therefor, combustor liners, support rings or disks, and exhaust nozzle flaps and seals.

In general, these CMC components are prepared by first creating a CMC preform which serves as the initial framework for creating the CMC component. The preform contains a stack of fabric sheets or plies in which the stack is formed via a layup process. The plies are made from ceramic fibers, or bundles of ceramic fibers called tows, held together with a binder. The fiber tows can be in the form of unidirectional tows, braided tows, or woven fibers. For example, the fibers can be woven into a two-dimensional fabric sheet or ply and then the plies are stacked during the layup process to form the preform. Alternatively, the preform can be in the form of a three-dimensional weave wherein, for example, a plurality of warp fibers are interwoven through a plurality of weft fiber layers. Binders can be used to help hold the fibers/plies together to provide a certain rigidity to the preform, for example, polymeric binders such as polyvinyl alcohol (PVA) or polyvinyl butyral (PVB).

The fibers/filaments used in the CMC preforms may be, for example, silicon carbide (SiC), carbon, mullite, zirconium carbide (ZrC), hafnium carbide (HfC), silicon nitride, aluminum oxide, or combinations thereof. The ceramic fibers may also be oxycarbide-, oxynitride-, carbonitride-, silicate-, boride-, phosphide-, or oxide-based fibers. In still further examples, the fibers are fully crystalline, partially crystalline, or predominantly amorphous or glassy. In one particular example, the fibers are SiC fibers.

The fibers of the preform can, optionally, be provided with one or several interphases deposited prior to introduction of a matrix material into the preform. This interphase coating can be, for example, a coating of boron nitride, silicon-doped boron nitride, boron-doped carbon, boron carbide, titanium nitride, or zirconium nitride which is applied by chemical vapor infiltration (CVI). The interphase coating(s) is used to prevent crack formation and/or propagation.

After the CMC preform is formed by the layup, the preform is subjected to densification to add matrix material to fill the remaining void spaces within the preform. This procedure stiffens and strengthens the fiber layers or woven plies of ceramic fiber tows to form the CMC. Thus, densification involves reducing the porosity within the preform, making it more solid and robust, by filling the remaining pores within the preform. The goal is to achieve a higher relative density, and ensure that the final CMC structure is compact and free of large voids. In one particular example, the CMC material contains SiC fibers within a SiC matrix, also referred to as a SiC/SiC composite.

Various methods can be used to add matrix material during densification. These include, but are not limited to, chemical vapor infiltration (CVI), reactive melt infiltration (RMI) (such as liquid silicon infiltration (LSI)), and polymer infiltration and pyrolysis (PIP).

As mentioned above, interference fits between CMC components and metallic hardware can result in damage to such as abrasion during assembly and/or over the duration of many operating cycles, thereby reducing the operation lifespan of these components. In accordance with the present disclosure, one or more spring elements are used to apply pressure to a structural feature of the CMC component to cause the CMC component to contact ancillary metal hardware for load transfer and engage the ancillary metal hardware in a sealing manner.

The spring elements can be made, for example, from sheet metal, wrought, and cold rolled material having high temperature and creep resistance. For example, the spring elements can be made from a Ni-based superalloy. Such Ni-based superalloys can contain 40 wt. % Ni or more, for example, 45-65 wt. % Ni. For example, suitable Ni-based superalloys include Ni, Cr and Mo alloys (nickel-chromium-molybdenum alloys), Ni, Cr, Co, and Mo alloys (nickel-chromium-cobalt-molybdenum alloys), and Ni, Cr, and Fe alloys (nickel-chromium-iron alloys), such as AMS 5879, AMS 5914, AMS 5950, AMS 5704-5709, AMS 5715, AMS 5754, and AMS 5798, and INCONEL® X-750 (AMS 5542 and AMS 5598).

The spring elements can be made, for example, from a Co-based superalloy. Such Co-based superalloys can contain 35 wt. % Co or more, for example, 35-70 wt. % Co. For example, suitable Co-based superalloys include Co, Cr, Ni, and W alloys (cobalt-nickel-chromium-tungsten alloys) such as Haynes 188 and Haynes 25 (AMS 5759). Such cobalt-nickel-chromium-tungsten alloys can contain Ni in amounts of, for example, less than 25 wt. % Ni.

Various forms of spring elements can be used. For example, the spring element can comprise one or more wave springs. Alternatively, the spring element can comprise one or more coil or helical springs. In another embodiment, the spring element can be a C-shaped spring.

Figure 2:
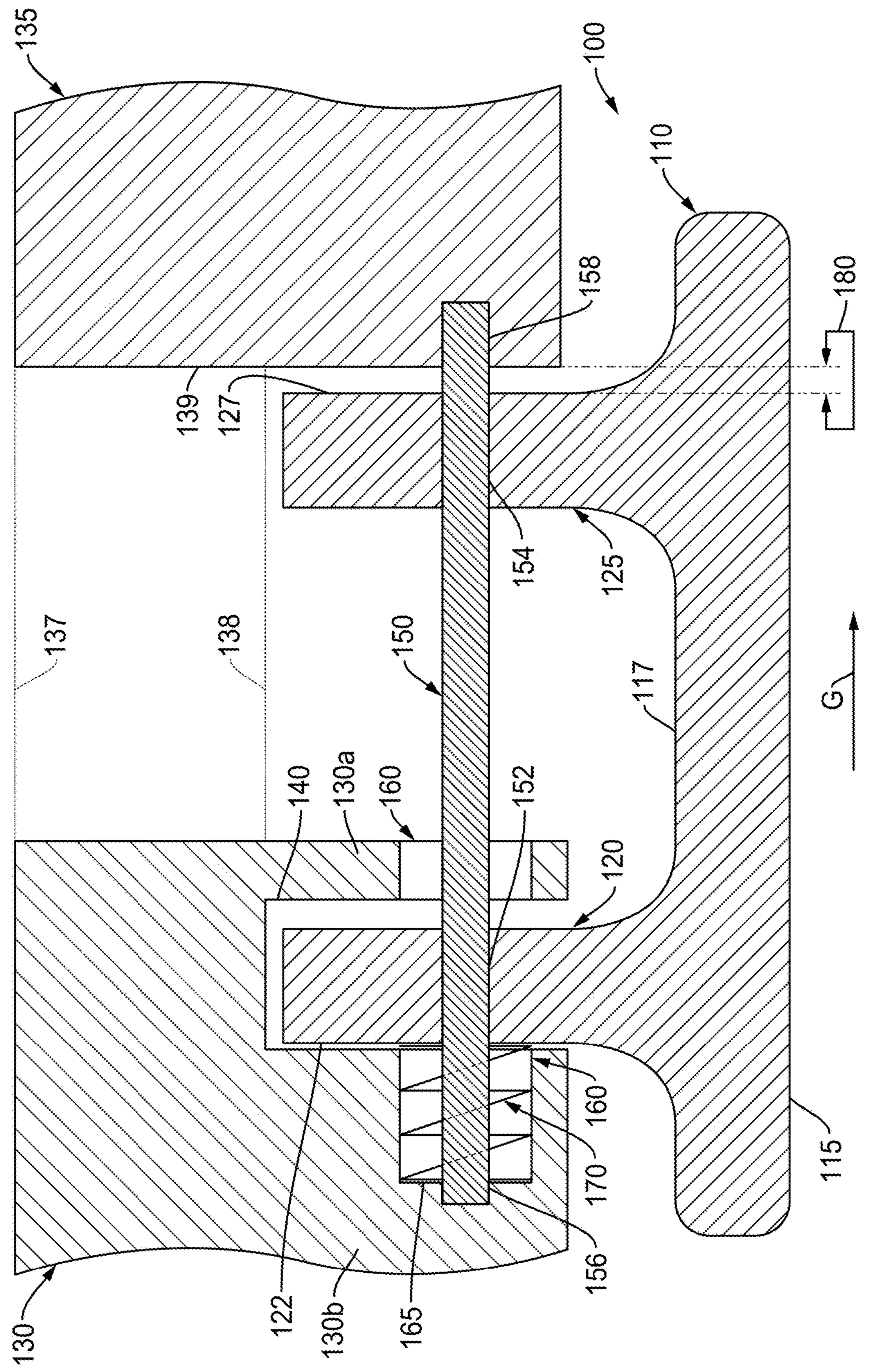
FIG. 2 schematically illustrates a cross sectional view of an embodiment of an arrangement for attaching a ceramic matrix component (CMC) to ancillary hardware of a gas turbine engine comprising a spring element to aid in sealing the CMC component to the ancillary hardware.

FIG. 2 shows a cross section of a CMC component 100, in this case a BOAS segment, having a base substrate 110 with a radial inner surface 115 (adjacent the gaspath G flowing in the axial direction towards the aft of the engine) and a radial outer surface 117. Two flanges, a forward flange 120 and an aft flange 125, extend in the radial direction from the outer radial surface 117. The component 100 is supported by ancillary hardware elements 130 and 135. Ancillary element 130 includes a slot into which forward flange 120 extends. The slot 140 is positioned between sections 130*a* and 130*b* of ancillary element 130.

It should be noted that rather than two separate ancillary hardware elements, a single ancillary hardware element that encompasses elements 130 and 135 can be used as indicated by dotted lines 137 and 138. Additionally, while the embodiment of FIG. 2 includes slot 140, this feature is optional. In other words, flange 120 can be adjacent ancillary element 130 without being positioned within a slot therein.

A retainment pin 150 passes through holes 152 and 154 in flanges 120 and 125, respectively, and the ends of retainment pin 150 are held in recesses 156 and 158 of ancillary elements 130 and 135, respectively. Additionally, ancillary element 130 is provided with a bore hole 160. The bore hole 160 extends through section 130*a* and into section 130*b* of ancillary element 130. As shown in the embodiment of FIG. 2, retainment pin 150 passes through bore hole 160. A spring element 170 is positioned within bore hole 160, between an end wall 165 of bore hole 160 and a forward surface 122 of flange 120. The compressive force of spring element 170 urges the component 100 to move in the axial direction. This movement causes the aft surface 127 of flange 125 to seal against surface 139 of ancillary element 135 closing gap 180. The closing and sealing of gap 180 allows for better control of cooling air flow above the radial outer surface 117 and the compressive force of spring element 170 aids in supporting component 100 against the ancillary element 135.

Figure 3:
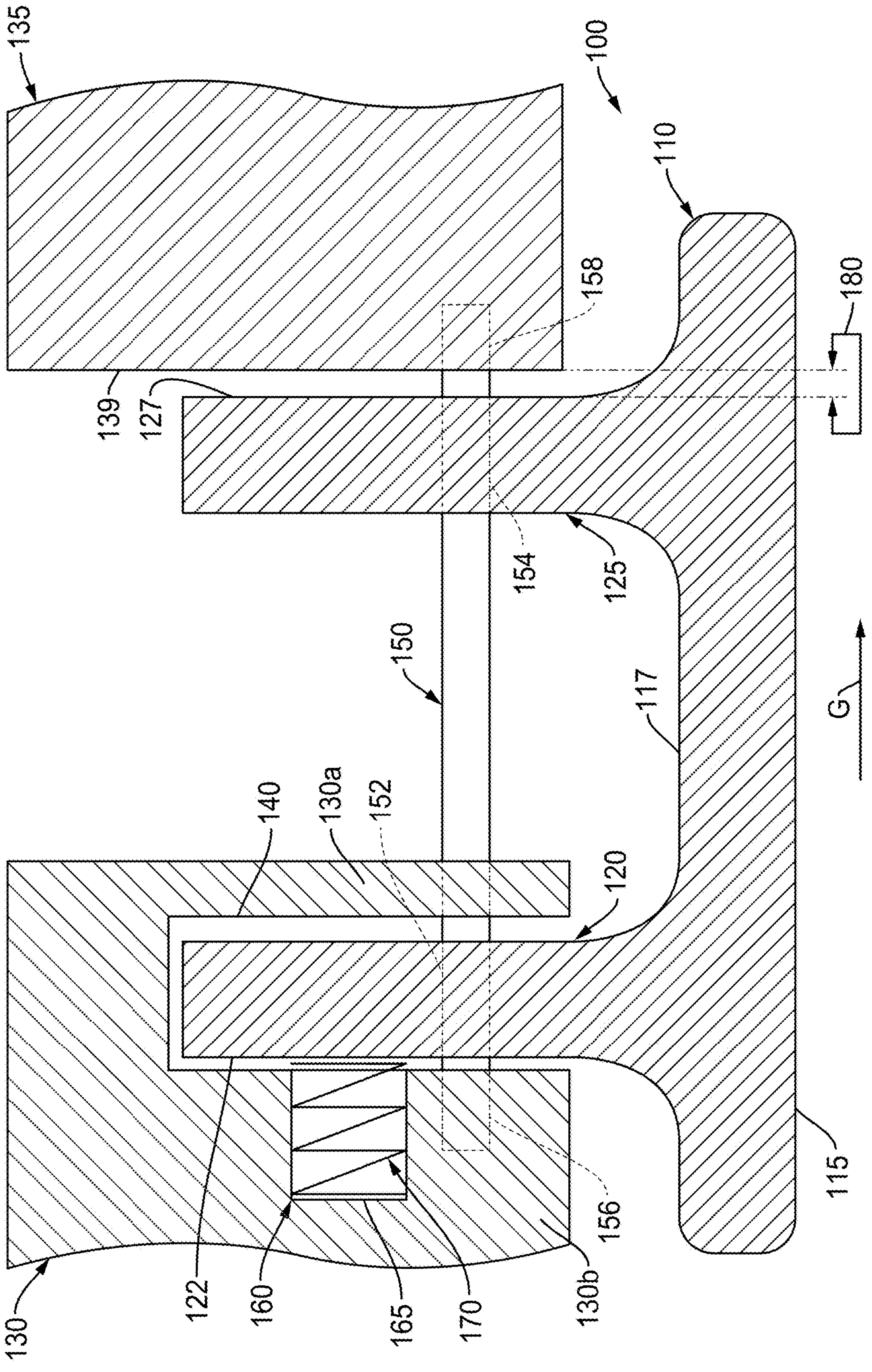
FIG. 3 schematically illustrates a cross sectional view of a further embodiment of an arrangement for attaching a ceramic matrix component (CMC) to ancillary hardware of a gas turbine engine comprising a spring element to aid in sealing the CMC component to the ancillary hardware.

FIG. 3 illustrates another embodiment of a spring element arrangement. In this embodiment, the bore hole 160 is offset from the retainment pin 150, i.e., the retainment pin 150 does not pass through bore hole 160, as in the embodiment of FIG. 2. As shown in FIG. 3, spring element 170 is positioned within bore hole 160, between end wall 165 and the forward surface 122 of flange 120. The compressive force of spring element 170 urges the component 100 to move in the axial direction. This movement causes the aft surface 127 of flange 125 to seal against surface 139 of ancillary element 135 closing gap 180. The closing and sealing of gap 180 allows for better control of cooling air flow above the radial outer surface 117 and the compressive force of spring element 170 aids in supporting component 100 against the ancillary element 135.

Figure 4:
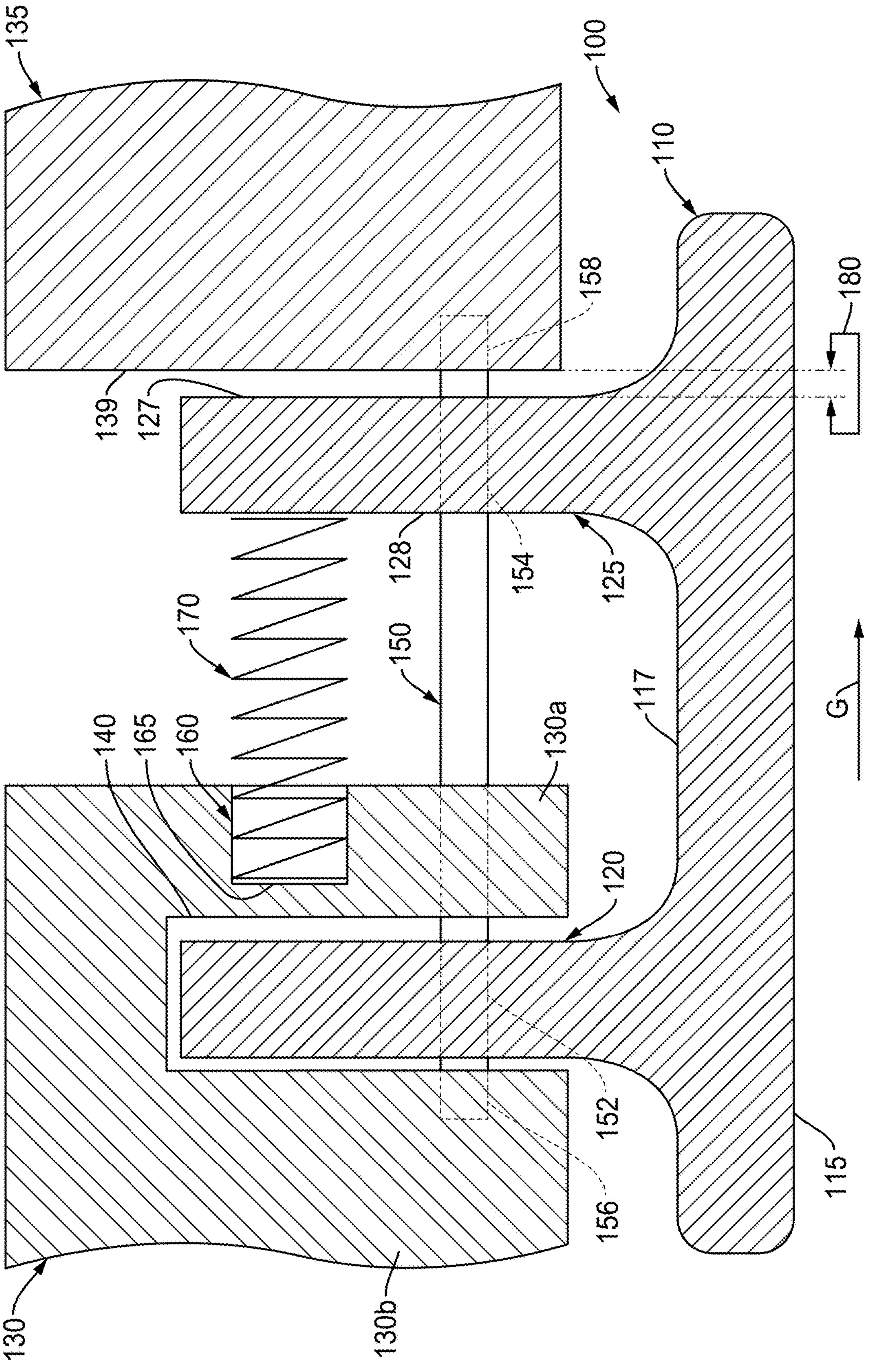
FIG. 4 schematically illustrates a cross sectional view of an additional embodiment of an arrangement for attaching a ceramic matrix component (CMC) to ancillary hardware of a gas turbine engine comprising a spring element to aid in sealing the CMC component to the ancillary hardware.

FIG. 4 illustrates a further embodiment of a spring element arrangement. As in FIG. 3, in this embodiment, the bore hole 160 is offset from the retainment pin 150, i.e., the retainment pin 150 does not pass through bore hole 160. In the embodiment of FIG. 4, spring element 170 is positioned within bore hole 160 and abuts end wall 165. However, spring element 170 does not engage the forward surface 122 of flange 120, but instead engages a forward surface 128 of aft flange 125. Here again, the compressive force of spring element 170 urges the component 100 to move in the axial direction. This movement causes the aft surface 127 of flange 125 to seal against surface 139 of ancillary element 135 closing gap 180. The closing and sealing of gap 180 allows for better control of cooling air flow above the radial outer surface 117 and the compressive force of spring element 170 aids in supporting component 100 against the ancillary element 135.

Figure 5B:
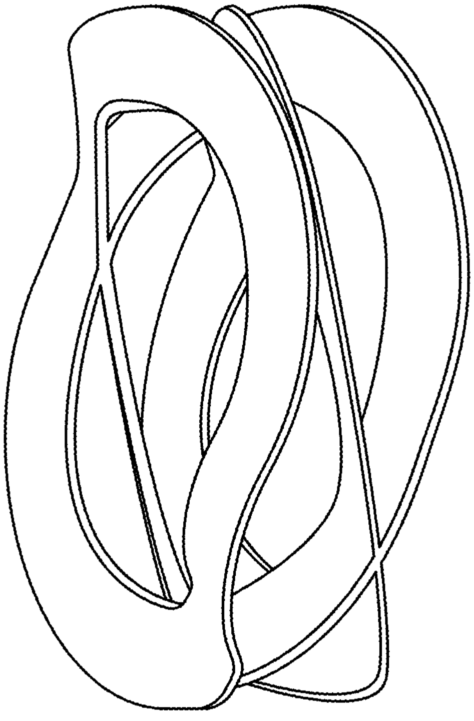
FIG. 5B illustrates another embodiment of a wave spring element.
Figure 5A:
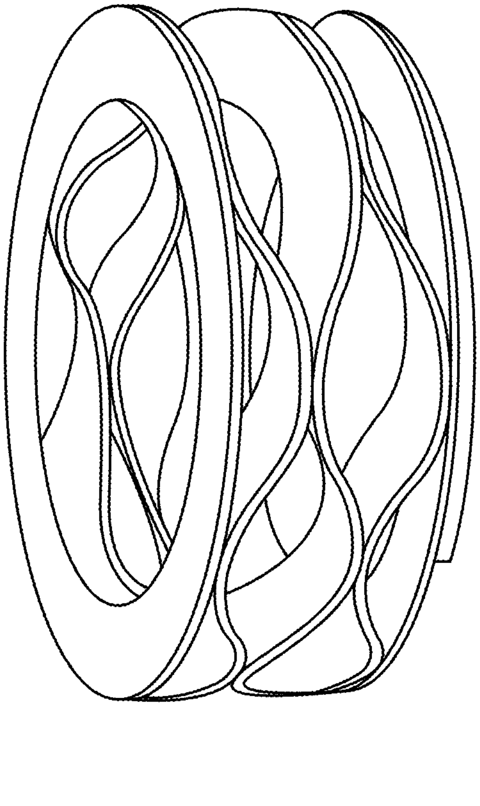
FIG. 5A illustrates an embodiment of a wave spring element.
Figure 5D:
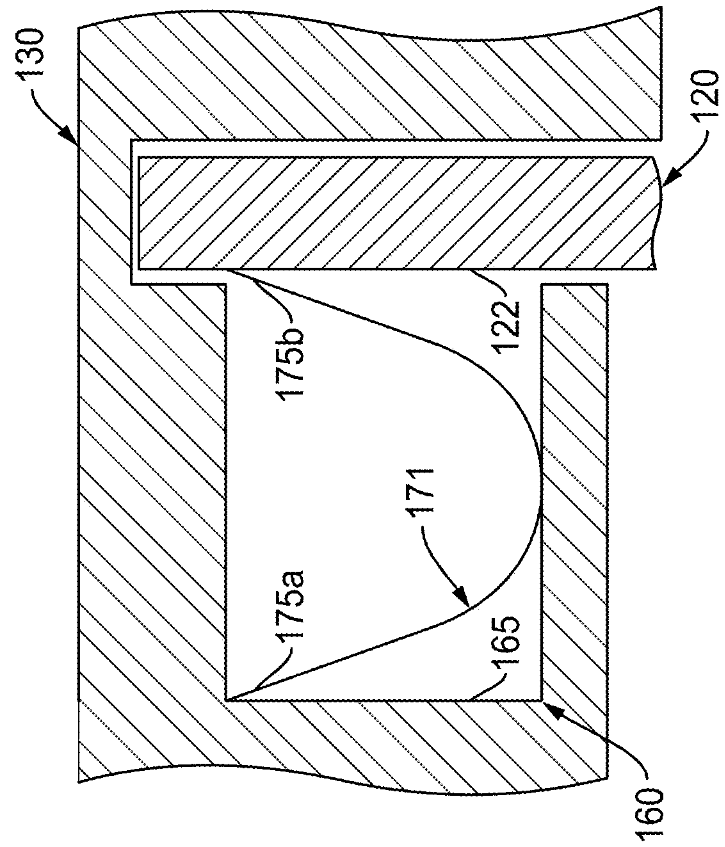
FIG. 5D illustrates an embodiment of a C-spring element.
Figure 5C:
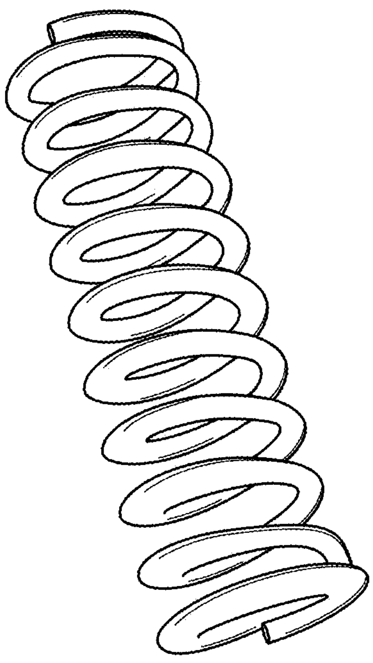
FIG. 5C illustrates an embodiment of a coil of helical spring element.

FIGS. 5A-5D illustrate various shapes of the spring elements. FIGS. 5A and 5B show two forms of wave springs. These springs are stackable and thus several wave springs can be used to form the spring element. FIG. 5C shows the spring element in the form of a coiled or helical spring. FIG. 5D shows a C-shaped spring element 171 within a bore hole 160 wherein one end 175*a* of C-shaped spring element 171 contacts the end wall 165 of the bore hole 160 and the other end 175*b* of C-shaped spring element 171 contacts the forward surface 122 of flange 120.

The present disclosure provides an efficient method and arrangement for to promote sealing and provide load transfer for supporting the CMC components without using an interference fit between the CMC component and the ancillary metal hardware.

While the present disclosure has been particularly described, in conjunction with specific preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present disclosure.

What is claimed is:

1. An arrangement for attaching a ceramic matrix component (CMC) to ancillary hardware of a gas turbine engine, the arrangement comprising:

the CMC component comprising a substrate containing ceramic fibers or fiber tows within a matrix, the substrate having an outer radial surface and a first forward flange and a second aft flange, each flange extending from the outer radial surface in the radial direction;

one or more ancillary hardware elements for bearing the load of the CMC component, wherein at least one of the one or more ancillary hardware elements has a slot for receiving one of the first forward flange and the second aft flange of the CMC component, and at least one of the one or more ancillary hardware elements has a bore hole;

a spring element positioned within the bore hole, wherein the bore hole has a cross section that accommodates the cross section of the spring element and the spring element is held in compression between an end wall of the bore hole and a surface of the one of the first forward flange and the second aft flange, whereby compressive force from the spring element held in compression urges at least one of the first forward flange and the second aft flange into sealing contact with a surface of one of the one or more ancillary hardware elements; and a retainment pin which passes through a hole in each of the first forward flange and the second aft flange, the retainment pin having a first end and a second end, wherein the first end and second end of the retainment pin are positioned within recesses in the one or more ancillary hardware elements to thereby support the CMC component.

2. The arrangement according to claim 1, wherein the spring element comprises one or more wave springs.

3. The arrangement according to claim 1, wherein the spring element comprises one or more coil or helical springs.

4. The arrangement according to claim 1, wherein the spring element is a C-shaped spring.

5. The arrangement according to claim 1, wherein the first end of a portion adjacent the retainment pin is positioned within the bore hole and the spring element surrounds the portion of the retainment pin.

6. The arrangement according to claim 1, wherein the spring element is held in compression between the end wall of the bore hole and a surface of the first forward flange, whereby compressive force from the spring element held in compression urges the second aft flange into sealing contact with the surface of the one of the one or more ancillary hardware elements.

7. The arrangement according to claim 1, wherein the spring element is held in compression between the end wall of the bore hole and a surface of the second aft flange, whereby compressive force from the spring element held in compression urges the second aft flange into sealing contact with the surface of the one of the one or more ancillary hardware elements.

8. The arrangement according to claim 1, wherein the spring element is made from a superalloy metal.

9. The arrangement according to claim 8, wherein the superalloy metal is a Ni-based superalloy or Co-based superalloy.

10. The arrangement according to claim 8, wherein the superalloy metal is selected from Ni, Cr and Mo alloys (nickel-chromium-molybdenum alloys), Ni, Cr, Co, and Mo alloys (nickel-chromium-cobalt-molybdenum alloys), and Ni, Cr, and Fe alloys (nickel-chromium-iron alloys).

11. The arrangement according to claim 8, wherein the superalloy metal is selected from AMS 5879, AMS 5914, AMS 5950, AMS 5704-5709, AMS 5715, AMS 5754, AMS 5798, AMS 5542, AMS 5598, AMS 5759, Haynes 188, and Haynes 25.

12. The arrangement according to claim 1, wherein the CMC component is a BOAS segment.

13. A method of attaching a ceramic matrix component (CMC) to ancillary hardware of a gas turbine engine, the method comprising:

providing the CMC component comprising a substrate containing ceramic fibers or fiber tows within a matrix, the substrate having an outer radial surface and a first forward flange and a second aft flange extending from the outer radial surface, and wherein a retainment pin passes through a hole in each of the first forward flange and the second aft flange, the retainment pin having a first end and a second end;

providing one or more ancillary hardware elements for bearing the load of the CMC component, the one or more ancillary hardware elements having a slot for receiving one of the first forward flange and the second aft flange of the CMC component, and a bore hole that connects to the slot, wherein the first end and/or the second end of the retainment pin are positioned within recesses in the one or more ancillary hardware elements to thereby support the CMC component; and positioning a spring element within the bore hole, wherein the bore hole has a cross section that accommodates the cross section of the spring element and the spring element is held in compression between a wall of the bore hole and a surface of the one of the first forward flange and second aft flange, and the retainment pin extends through the spring element.

14. The method according to claim 13, wherein the spring element comprises one or more wave springs.

15. The method according to claim 13, wherein the spring element comprises one or more coil or helical springs.

16. The method according to claim 13, wherein the spring element is a C-shaped spring.

17. The method according to claim 13, wherein a portion adjacent the first end of the retainment pin is positioned within the bore hole and the spring element surrounds the portion of the retainment pin.

18. A turbine engine comprising:

a fan section, a compressor section, a combustion section, and a turbine section, the turbine section including at least one rotor and one or more turbine blade(s) extending radially outwardly from the at least one rotor;

a CMC component comprising a substrate containing ceramic fibers or fiber tows within a matrix, the substrate having an outer radial surface and a first forward flange and a second aft flange, each flange extending from the outer radial surface in the radial direction;

one or more ancillary hardware elements for bearing the load of the CMC component, wherein at least one of the one or more ancillary hardware elements has a slot for receiving one of the first forward flange and the second aft flange of the CMC component, and at least one of the one or more ancillary hardware elements has a bore hole, a spring element positioned within the bore hole, wherein the bore hole has a cross section that accommodates the cross section of the spring element and the spring element is held in compression between an end wall of the bore hole and a surface of the one of the first forward flange and the second aft, whereby compressive force from the spring element held in compression urges at least one of the first forward flange and the second aft flange into sealing contact with a surface of one of the one or more ancillary hardware elements, and a retainment pin which passes through a hole in each of the first forward flange and the second aft flange, the retainment pin having a first end and a second end, wherein the first end and second end of the retainment pin are positioned within recesses in the one or more ancillary hardware elements to thereby support the CMC component.

* * * * *